AIRSPEED INDICATING APPARATUS
Filed May 25, 1967 2 Sheets-Sheet 1
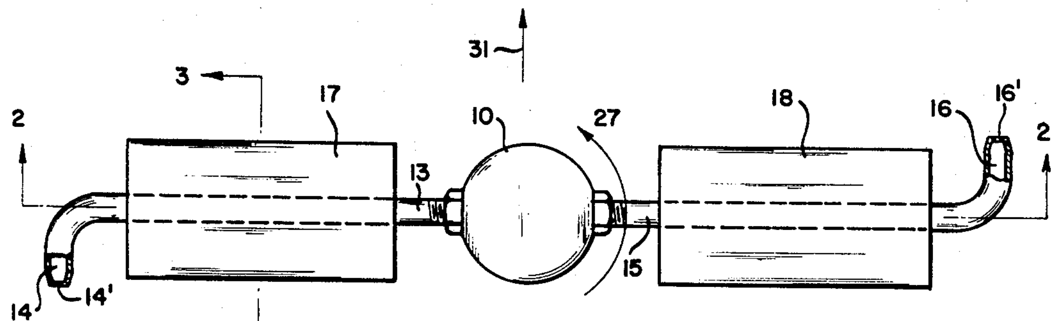
FIG. 1
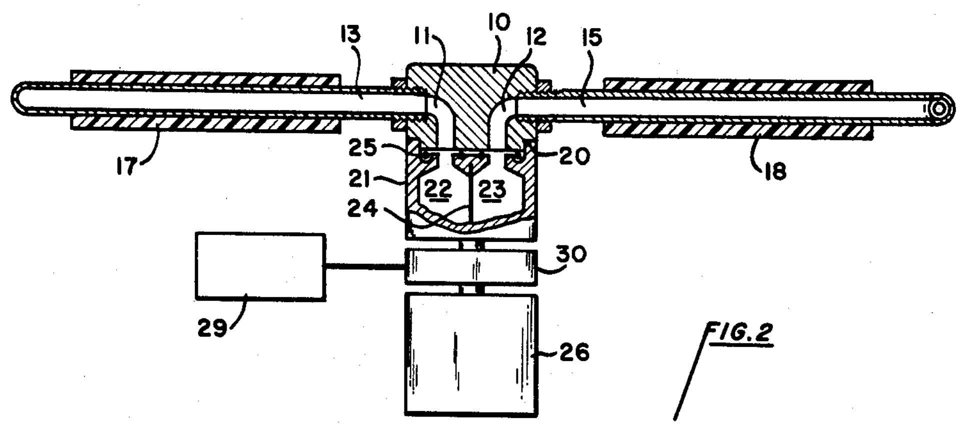
FIG. 2
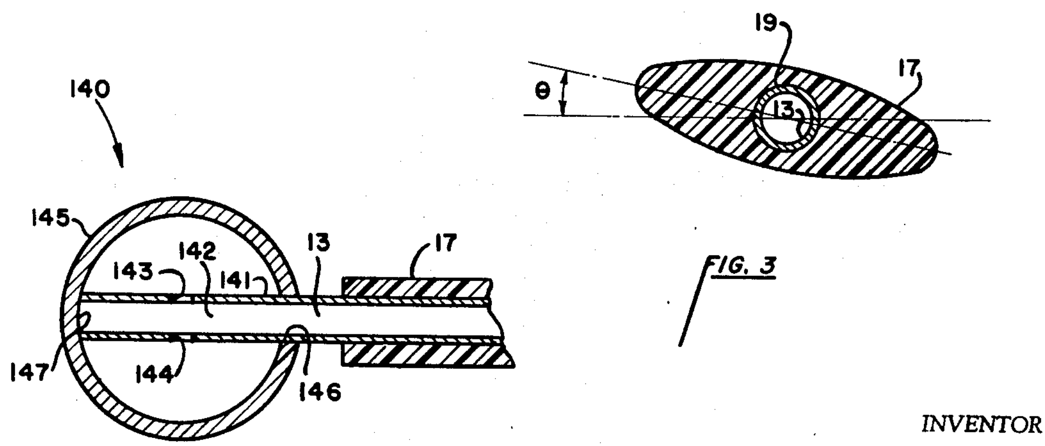
FIG. 3
FIG. 5
INVENTOR
JOHN L. BEILMAN
BY
ATTORNEY

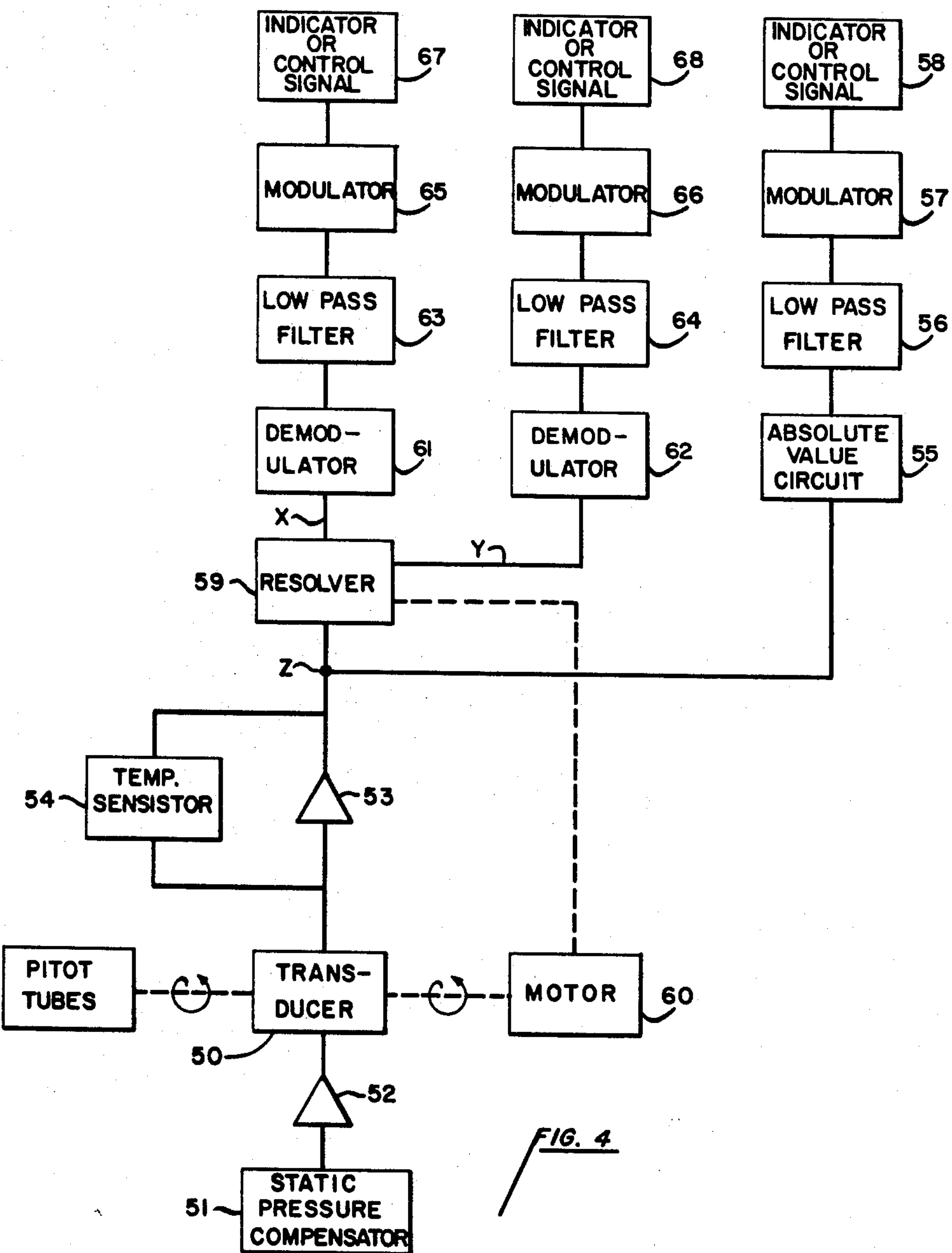
INVENTOR
JOHN L. BEILMAN
BY [signature]
ATTORNEY

United States Patent Office 3,400,584
Patented Sept. 10, 1968

3,400,584
AIRSPEED INDICATING APPARATUS

John Leon Beilman, Lancaster, N.Y., assignor to Cornell Aeronautical Laboratory, Inc., Buffalo, N.Y., a corporation of New York Continuation-in-part of application Ser. No. 529,001, Feb. 21, 1966. This application May 25, 1967, Ser. No. 641,214
9 Claims. (Cl. 73—182)

ABSTRACT OF THE DISCLOSURE

A true airspeed indicating instrument utilizing a sensor rotated at constant speed by a motor detached from the craft's propulsion system. The sensor employs static pressure probes mounted at the tips and air foils having opposite angles of incidence are mounted on the sensor arm to minimize centrifugal effects.

CROSS-REFERENCE TO RELATED APPLICATION

This application is a continuation-in-part of application Ser. No. 529,001 filed Feb. 21, 1966.

BACKGROUND OF THE INVENTION

The present invention relates to airspeed indicators, and more particularly to airspeed indicators that are sensitive to very low air speeds.

Air speed indicators are known which are designed to measure the low airspeeds encountered in helicopter flights. These indicators comprise one or more rotating pitot tubes, wherein the amplitude of the cyclic variations in pressure sensed by the tube or tubes, as they move into the direction of flight and away therefrom is directly proportional to the forward velocity or airspeed of the aircraft. To develop higher pressure differentials for greater sensitivity, these types of indicators utilize independent motor means to rotate the tube or tubes. In this manner, the pressures sensed by the tubes are much higher than those that would be developed only by the low airspeed.

Attempts to record or measure airspeeds lower than approximately five knots have not been successful with prior devices. Thus, with these prior devices there exists a minimum threshold value of sensitivity.

This inability to measure airspeeds below a minimum threshold value is thought to be due to a radial flow or whirl that is generated by the instrument itself. The prior instrument basically comprises a rotating arm having a pitot tube at the end thereof. The rotating arm generates a flow from above and below the arm center and radially outward along the length of the arm, much like the action of a centrifugal pump. At very low airspeeds, this flow enveloping the pitot tube prevents the tube from sensing the pressures which are generated by the forward speed of the aircraft. At higher speeds this induced flow has not interfered with operation of the instrument or measurement of velocity.

SUMMARY OF THE INVENTION

The foregoing and other disadvantages of prior instruments are overcome by the present invention which according to one aspect thereof means is provided to permit the airspeed instruments, generally similar to those heretofore described, to respond to very low air speeds. Basically, this is accomplished by mounting air foils on each arm that function to counteract the effects of the centrifugal whirl produced in the plane of the arm at low relative air speeds.

According to another aspect of the present invention, a velocity sensing means is provided which expands the range of sensitivity of the instrument whereby extremely high as well as extremely low airspeeds can be measured. To this end, the rotating arms terminate in tip portions that contain velocity sensing ports the axes of which are parallel to the rotational axis of the arms such that the air flow is tangential to the ports. To minimize angle of attack effects and to straighten the air flow a cylindrical shrould is located about the velocity sensing tip portion of the arms.

It is accordingly a primary object of the present invention to provide an improved rotating tube airspeed indicator that is sensitive to extremely low airspeeds; namely, those below the threshold values of prior instruments.

It is a more specific object of the present invention to provide a rotating tube airspeed indicator with means to eliminate the self-generated flow in the plane of airspeed measurement.

Another object of the present invention is to provide an airspeed indicator which is adapted to measure the low airspeeds encountered by helicopters and other VTOL (vertical takeoff and landing) aircraft.

Another object of the present invention is to provide an indicator which can accurately measure extremely low wind velocities.

Still other objects and advantages of the present invention will become apparent from a reading of the following detailed description of the same taken in conjunction with the accompanying drawings wherein:

FIGURE 1 is a top plan schematic view of an airspeed sensing instrument of apparatus embodying the present invention.

FIGURE 2 is a partial vertical longitudinal sectional view thereof taken along line 2—2 of FIGURE 1, including some elements not shown in FIGURE 1.

FIGURE 3 is a transverse sectional view thereof taken along line 3—3 of FIGURE 1.

FIGURE 4 is a block diagram of the entire indicating apparatus.

FIGURE 5 is a fragmentary view similar to FIGURE 2 illustrating a modification.

DESCRIPTION OF THE PREFERRED EMBODIMENT

Referring now to the drawings, the airspeed sensing instrument comprises a central hub portion 10 in the shape of a disc having elbow-shaped passages 11 and 12 suitably drilled therein. Communicating with the horizontal portion of passage 11 and suitably attached to hub 10 is one end of an elongated straight tubular arm 13 arranged horizontally and having at its other end and disposed at right angles thereto a horizontal velocity head sensing pitot tube 14 having a total pressure orifice 14' in the outer end thereof. It is clear that pitot tube 14 could be separate and suitably connected to arm 13 if desired.

Communicating with passage 12 and suitably attached to hub 10 is a second elongated straight tubular arm 15 which is also horizontally arranged but 180° disposed with respect to arm 13. The arms 13 and 15 are rigidly mounted to hub 10 so that no relative movement therebetween is possible. At the outer end of arm 15 is a second pitot tube 16 having a total pressure orifice 16' therein, which is oriented 180° from total pressure orifice 14' of pitot tube 14.

Fixedly mounted on arms 13 and 15, as by welding, and extending lengthwise thereof and intermediate the ends thereof are a pair of air foils 17 and 18 severally having a longitudinal opening 19 therethrough for the reception of the corresponding arm 13 or 15. The air foils can be made of any suitable material, for example, a molded plastic. As shown in FIGURE 3, the air foil 17 is pitched at an angle $\theta$ with respect to the horizontal and typically this angle $\theta$ may be about 5°. The other air foil 18 is pitched at a similar angle but reversed with respect to air foil 17 in the manner of a propeller. It is immaterial to the invention whether air foils 17 and 18 upon rotation about a vertical axis move a column of air upwardly or downwardly.

Suitably attached to the lower end 20 of hub 10 is a transducer unit 21. The input portion of this unit is shown in cutaway in FIGURE 2 and comprises a pair of chambers 22 and 23 separated by a differential pressure sensing diaphragm 24. Chambers 22 and 23 communicate respectively with the lower vertical ends of passages 11 and 12 and are sealed with respect to each other and the exterior of unit 20 by means of a plurality of O-rings 25. Existence of a different pressure in chambers 22 and 23 will cause diaphragm 24 in flex or bend in proportion to the extent of the differential pressure.

Mounted in unit 21 may be any suitable transducer for converting the movement of diaphragm 24 into an electrical signal as, for example, a variable reluctance type pickoff, or simply, a strain gage unit.

Provided below hub 10 and transducer unit 21 is a motor unit 26 for rotating about a vertical axis unit 21, hub 10 and arms 13, 15 at a substantially constant speed in the direction of arrow 27 in FIGURE 1. The electrical signal output of transducer unit 21 is conveyed to the electronic portion of the apparatus shown in block form at 29 by means of a slip-ring and brush assembly 30 as is well known to those skilled in the art.

Referring to FIGURE 1, the arrow 31 represents the horizontal direction of the wind relative to the craft on which the inventive airspeed indicating apparatus is mounted.

The pressure difference that is sensed by diaphragm 24 is given by the formula:

$$\Delta p = 2_{\rho} V V_S \sin \omega t$$

where $\rho$ is the air density,
V is the relative velocity or airspeed,
$V_S$ is the linear velocity at the arm tips due to the constant rotational speed, $\omega$, thereof, and,
$\omega t$ is the angle that arms make with the direction of the relative wind.

Neglecting, for the moment, density changes, it can be seen that the sensed pressure difference between pitot tubes 14 and 16 is a direct function of V, the relative airspeed. To compensate for air density variations, the transducer represented at 50 in FIGURE 4 is excited by a voltage that is adjusted to compensate for static pressure variations by means of a static pressure compensator 51 which could be a 15 p.s.i. pressure transducer, this voltage being suitably amplified at 52. Since density is a function of temperature as well as pressure, the output of transducer 50 must be also adjusted for temperature variations. This can be achieved by suitably varying the gain of transducer output amplifier 53, as by a temperature responsive sensistor 54. Thus, the signal appearing at $z$ in FIGURE 4 is a suppressed carrier signal with the modulation amplitude proportional to the airspeed V. The carrier frequency is that of the transducer excitation voltage. The modulation frequency is the rotational frequency of the motor driven pitot tubes. To obtain the magnitude of the airspeed the signal at $z$ is applied to circuitry comprising an absolute value circuit 55, a low pass filter 56 and a modulator 57, the output from which may be applied to an indicator 58 and/or utilized for control purposes.

In order to provide directional indications, the relative airspeed electrical signal at $z$ in FIGURE 4 may be fed into a resolver unit 59 which may have two rotor windings and is driven by motor unit 60. The two signals leaving resolver 59, viz., X and Y, are functions of the components of velocity along respectively the fore and aft axis of the aircraft and an axis laterally thereof or perpendicular thereto. These two signals are fed through their respective indicating circuits comprising demodulators 61, 62, low pass filters 63, 64, modulators 65, 66, and indicators 67, 68. As is apparent the ratio of the lateral velocity to the fore and aft velocity gives an indication of the aircraft side slip angle. Since the electronic indicating circuitry forms no part of the present invention, no further discussion thereof is deemed necessary.

The manner in which the airspeed sensing instrument of the present invention permits accurate readings of very low airspeeds, down even to zero magnitude will now be discussed.

As pitot tubes 14 and 16 rotate in the direction of arrow 27 in FIGURE 1, a flow of air is generated that is substantially perpendicular to the plane of rotation of the tubes due to the slight pitch of air foils 17 and 18. This flow of air being substantially normal to the plane of measurement does not interfere with the signals sensed in said plane.

Without the air foils 17 and 18 of the present invention, the rotation of arms 13 and 15 would create a centrifugal flow in the rotation plane which flow would prevent the pitot tubes from sensing a signal that is indicative of low values of the relative velocity.

As stated earlier, the air foils of the present invention enable the measuring and indicating system to sense and record speeds down to zero, whereas, without said foils the lower limit of sensitivity has been about five knots. In the same manner, not fully understood, the flow of air substantially perpendicularly to the plane of rotation of arms 17 and 18 counteracts the effect on the pitot tubes 14 and 16 of the centrifugal whirl produced in the plane of these arms at low relative airspeeds.

Although the foregoing embodiment has proved to be extremely accurate in the very low airspeed ranges, when the forward speed of the craft to which the instrument is attached exceeds the sensor linear tip speed (due to the angular velocity of the arms) such that one of the pitot ports will be moving through the relative wind backwards, the instrument has failed to operate.

In addition, under severe winter conditions, it has been found that the build-up of ice about pitot ports 14' and 16' obstructs the flow therethrough.

To alleviate the foregoing problems, the embodiment shown in FIGURE 5 has been provided. The view shows a fragmentary section similar to FIGURE 2 with the exception that the pitot tubes are replaced by a modified form of sensing means indicated generally at 140.

Means 140 comprises a tip portion 141 having a passage 142 which is a coaxial extension of tubular arm 13, static pressure sensing means in the form of a pair of opposed ports 143 and 144 in a side wall of arm 13 communicating with passage 142 and a symmetrical hollow cylindrical shroud 145. Shroud 145 is of constant internal diameter and extends beyond the tip 141 in the fore and aft direction. The common central axis of the ports is parallel to the rotational axis of the arms 15 and 17, such that the air flows tangentially of the ports. Although not shown, identical means 140 is provided at the end of arms 15. A side opening 146 in the shroud allows tip portion 141 to pass therethrough with an outer end of the tip portion sealingly abutting and fully closed by an opposite side 147 of the shroud. To fix the tip portion 141 to the shroud at 146 and 147, welds or silver soldering may be provided.

The operation of the modification of FIGURE 5 is the same as for the embodiment previously described except that the pressure sensed by ports 143 and 144 is now a static pressure, since the air stream is now flowing tangent to the ports. The shroud 145 functions to straighten the flow and thereby minimize angle of attack effects.

It is important to note that due to the symmetry of the sensing means 140 in the fore and aft direction, it is immaterial insofar as sensitivity is concerned that the forward speed of the aircraft is greater than the linear tip speed of the sensing means. The ports located tangentially of the flow will still sense a pressure on one side whose peak value is a function of the tip speed plus forward speed and on the other side the forward speed minus the tip speed. It is for this reason that the modification of FIGURE 5 will respond to high as well as low airspeeds.

In addition it has been found that little or no icing of the sensing ports 143 and 144 occurs in severe winter conditions. This is attributed to the fact that the pressure is not being sensed at a stagnation point as was the case with the pitot tube of the previous embodiment.

This increased sensitivity of the instrument of the present invention makes it particularly suitable for use on the helicopters and other VTOL aircraft where zero airspeeds are obtainable, and when so used is located in a position detached from the propulsion system thereof. In addition, the apparatus of the present invention may be used for measuring surface wind velocities, and as used herein, "airspeed" is intended to include the speed of air as well as the speed of an object moving in air.

While preferred embodiments of the present invention have been illustrated and described, other embodiments will occur to those skilled in the art. For example, vanes may be used instead of pitot tubes in the FIGURE 1 embodiment, since both types of devices are responsive to the velocity head of air flowing relative thereto. Also a symmetrical venturi tube could be used in place of the cylindrical shroud in the FIGURE 5 embodiment. Therefore, it is intended that the invention be limited only by the scope of the appended claims.

I claim:

1. An airspeed measuring apparatus, comprising;

(a) velocity sensing means mounted for movement in a fluid stream, (b) motor means for moving said sensing means at a substantially constant rate, (c) said velocity sensing means comprising a tubular tip member, including (d) static pressure sensing means on said tip member and oriented such that said fluid stream flows tangentially thereof, and (e) symmetrical hollow shroud means, having fully open opposite ends, surrounding said velocity sensing means for straightening said fluid stream and minimizing angle of attack effects.

2. An airspeed indicating apparatus adapted for use on aircraft and when so used located in a position detached from the propulsion system thereof comprising;

(a) at least one generally tubular hollow arm mounted for rotation about a first axis, said arm having side walls and a fully closed end wall remote from said first axis, (b) motor means for rotating said arm at a substantially constant speed, and (c) velocity sensing port means located in said side wall for placing the exterior of said hollow arm in communication with the interior thereof the axis of said port means being parallel to said first axis.

3. The apparatus according to claim 2, further comprising;

(d) symmetrical hollow shroud means mounted on said arm and surrounding said port means, said shroud means having fully open opposite ends.

4. The apparatus according to claim 3, further comprising;

(e) transducer means responsive to the pressure at said sensing port means for developing alternating signals at the frequency of rotation of said sensing means, and (f) indicating means connected to said transducer means to provide magnitude and directional indications of the relative air speed.

5. The apparatus according to claim 4, further comprising;

(g) a second arm rotatable about said first axis and spaced substantially 180° from said one arm, (h) velocity sensing port means located on an end of said second arm, the axis of which port means being parallel to said first axis, (i) said motor means is also operatively associated with said second arm for rotating the same at a substantially contant speed in unison with said first arm, and (j) said transducer means is also responsive to the pressure at said port means on said second arm.

6. The apparatus according to claim 5, further comprising;

(k) means fixed on each of said arms for developing a flow that is substantially perpendicular to the plane of rotation of said arms to thereby counteract the effect on said sensing ports of the centrifugal whirl produced in the plane of said arms at low relative air speeds.

7. The apparatus according to claim 6, wherein;

(l) said means fixed on each of said arms comprise air foils pitched in opposite directions.

8. The apparatus according to claim 3, further comprising;

(e) an air foil fixedly mounted on said arm.

9. The apparatus according to claim 2, further comprising;

(d) an air foil fixedly mounted on said arm.

References Cited

UNITED STATES PATENTS

| | | | |
|---|---|---|---|
| 2,524,747 | 10/1950 | Ayres et al. ______ | 73—182 XR |
| 2,846,878 | 8/1958 | Carbonara ___________ | 73—182 |
| 2,986,933 | 6/1961 | Summerlin et al. __ | 73—178 XR |
| 3,329,016 | 7/1967 | Leavens et al. ____ | 73—178 XR |
| 3,332,282 | 7/1967 | Daw ________________ | 73—182 |

DAVID SCHONBERG, *Primary Examiner.*

N. B. SIEGEL, *Assistant Examiner.*